US010404072B2

(12) United States Patent
Palombini et al.

(10) Patent No.: US 10,404,072 B2
(45) Date of Patent: Sep. 3, 2019

(54) METHOD AND APPARATUS FOR BIDIRECTIONAL STORAGE AND RENEWABLE POWER CONVERTER

(71) Applicant: DYNAPOWER COMPANY LLC, South Burlington, VT (US)

(72) Inventors: John C. Palombini, South Burlington, VT (US); Apurva Somani, South Burlington, VT (US)

(73) Assignee: DYNAPOWER COMPANY LLC, South Burlington, VT (US)

( * ) Notice: Subject to any disclaimer, the term of this patent is extended or adjusted under 35 U.S.C. 154(b) by 0 days.

(21) Appl. No.: 16/103,145

(22) Filed: Aug. 14, 2018

(65) Prior Publication Data

US 2019/0052092 A1 Feb. 14, 2019

Related U.S. Application Data (60) Provisional application No. 62/545,159, filed on Aug. 14, 2017.

(51) Int. Cl.
*H02J 3/32* (2006.01)
*H02J 3/38* (2006.01)
(Continued)

(52) U.S. Cl.
CPC .............. *H02J 3/385* (2013.01); *H02J 3/32* (2013.01); *H02J 3/382* (2013.01); *H02J 3/383* (2013.01);
(Continued)

(58) Field of Classification Search
CPC .. H02J 3/382; H02J 3/383; H02J 3/385; H02J 3/386; H02J 7/0068; H02M 7/797
(Continued)

(56) References Cited

U.S. PATENT DOCUMENTS

2010/0231173 A1* 9/2010 Andrea ................... H02J 7/022
320/137
2012/0112547 A1* 5/2012 Ghosh ..................... H02J 9/062
307/66
(Continued)

FOREIGN PATENT DOCUMENTS

| EP | 2325970 A2 | 5/2011 |
| EP | 2874266 A2 | 5/2015 |
| JP | 2002-171674 A | 6/2002 |

OTHER PUBLICATIONS

International Search Report and Written Opinion dated Oct. 5, 2018, PCT/US2018/046427.

*Primary Examiner* — Hal Kaplan
(74) *Attorney, Agent, or Firm* — Ladas & Parry LLP (57) ABSTRACT

An energy storage system for renewable energy applications includes a renewable energy source, a bidirectional inverter connected an AC bus and a DC bus, an energy storage unit connected to the bidirectional DC/DC converter, and a control system comprising one or more controllers coupled to the bidirectional inverter and the bidirectional DC/DC converter. The bidirectional inverter is connected to the renewable energy source and a bidirectional DC/DC converter through the DC bus. The control system is configured to facilitate the operation of the bidirectional DC/DC converter and the bidirectional inverter. The energy storage system both stores energy from the renewable energy source and a utility grid, and also supplies power to the utility grid. The energy storage system is utilized in a method for supporting frequency regulation of a utility grid and a method for controlling an output power ramp rate for a renewable energy storage system.

20 Claims, 5 Drawing Sheets (51) Int. Cl.
*H02J 7/00* (2006.01)
*H02M 7/797* (2006.01)

(52) U.S. Cl.
CPC ............ *H02J 3/386* (2013.01); *H02J 7/0068* (2013.01); *H02M 7/797* (2013.01)

(58) Field of Classification Search
USPC .......................................................... 307/22
See application file for complete search history.

(56) References Cited

U.S. PATENT DOCUMENTS

| | | |
|---|---|---|
| 2013/0241495 A1 | 9/2013 | Min |
| 2016/0114693 A1* | 4/2016 | Tsuno ................. B60L 11/1816 320/134 |
| 2016/0172864 A1 | 6/2016 | Terazono et al. |
| 2017/0005564 A1 | 1/2017 | Somani |
| 2018/0013291 A1* | 1/2018 | Ohashi ...................... H02J 3/32 |

* cited by examiner

METHOD AND APPARATUS FOR BIDIRECTIONAL STORAGE AND RENEWABLE POWER CONVERTER

BACKGROUND OF THE INVENTION

Field of the Invention

The present invention relates generally to energy storage systems, and more specifically, to an energy storage system and method providing a control mode for renewable energy applications.

Background

Electric power conversion devices and associated control systems may be used to interface various energy resources. For example, a power system can include a variety of interconnected distributed energy resources (e.g., power generators and energy storage units) and loads. The power system may be referred to as a microgrid system, and may connect to a utility grid or another microgrid system. The power system employs the electric power conversion to convert power between these energy resources (e.g., AC/DC, DC/DC, AC/AC and DC/AC).

Power systems may be designed to supply power, regulate power and transfer energy from one source to another with the goal of providing power to a load. It is desirable to provide power in the most efficient manner possible to maximize energy generation. However, topology limitations and design requirements can be limitations on energy generation and the amount of power that is ultimately available for use.

An energy storage system is a power system in which at least one of the energy resources is an energy storage unit (e.g., battery energy storage or flywheel energy storage). Often, in the energy storage system, the energy storage unit stores energy from a renewable energy source, such as solar panels or wind. However, energy from a grid, such as a utility grid or another microgrid, is often available for storage in energy storage units.

The energy storage system may be a microgrid that includes a variety of interconnected energy resources. Although, current energy storage systems include systems in which power from a renewable source is stored in an energy storage system or power from a grid is stored in an energy storage systems, the energy storage systems are restricted in the manner and direction from which energy is stored.

BRIEF SUMMARY OF THE INVENTION

Embodiments of the present invention include an energy storage system for renewable energy applications, a method of supporting frequency regulation of a utility grid, and a method for controlling the output power ramp rate of a renewable energy source.

In one aspect, an energy storage system for renewable energy applications includes a renewable energy source and a bidirectional inverter connected an AC bus and a DC bus. The bidirectional inverter is connected to the renewable energy source and a bidirectional DC/DC converter through the DC bus. An energy storage unit connected to the bidirectional DC/DC converter and a control system including one or more controllers coupled to the bidirectional inverter and the bidirectional DC/DC converter, the control system configured to facilitate the operation of the bidirectional DC/DC converter and the bidirectional inverter.

The renewable energy source may be at least one of a PV array, a wind energy source, or a hydro energy source.

The bidirectional inverter may be connected to at least one of a utility grid, a local load, or a microgrid through the AC bus.

The control system may also include one or more sensors, the one or more sensors configured to sense at least one of voltage magnitude, frequency, and phase.

The control system may be configured to synchronize at least one of the frequency, phase, and magnitude of the voltage or current of the inverter when providing power to the at least one of a utility grid, local load, or microgrid.

The energy storage unit may be at least one of a battery, a battery bank, or a flywheel energy storage unit.

The control system may control the bidirectional inverter to operate in a maximum power point tracking (MPPT) mode.

The control system may selectively enable the operation of the bidirectional inverter and the bidirectional DC/DC converter to export power generated by the renewable energy source to a grid, charge the energy storage unit from the grid, or discharge the energy storage unit to the grid.

The renewable energy source may be a photovoltaic (PV) array and the control system may be configured to sample an output power from the PV array and selectively apply impedance to obtain a maximum power.

The bidirectional inverter may include a plurality of DC connections at the DC bus for a single AC output at the AC bus, and the bidirectional inverter may be configured to optimize a maximum power for each of the plurality of DC connections.

The bidirectional inverter may be a bidirectional PV inverter and the renewable energy source may be a PV array. The bidirectional PV inverter may include one or more semiconductor switches, where gates of the semiconductor switches receive a plurality of switching pulses from the control system to convert DC power received from the PV array to AC power, or to convert AC power received through the AC bus to DC power.

The energy storage unit may be configured to store energy from both the renewable energy source and a grid.

In an aspect, a method of regulating frequency of a utility grid voltage by an energy storage system, includes receiving a power command; supplying power to the utility grid for frequency regulation when the power command is a positive power command; absorbing power from the utility grid when the power command is a negative power command; and receiving a subsequent power command, and supplying power to the utility grid or absorbing power from the utility grid in accordance with the subsequent power command.

The energy storage system may include a renewable energy source; a bidirectional inverter connected an AC bus and a DC bus, where the bidirectional inverter may be connected to the renewable energy source and a bidirectional DC/DC converter through the DC bus, and the bidirectional inverter may be connected to the utility grid through the AC bus; an energy storage unit may be connected to the bidirectional DC/DC converter; and a control system may include one or more controllers coupled to the bidirectional inverter and the bidirectional DC/DC converter, the control system may be configured to facilitate the operation of the bidirectional DC/DC converter and the bidirectional inverter.

The supplying power to the utility grid may include selectively enabling, by the control system, the operation of the bidirectional inverter and the bidirectional DC/DC converter to supply power generated by the renewable energy source to the utility grid or discharging the energy storage unit to the grid, and the absorbing power from the utility grid may include charging the energy storage unit from the grid.

The control unit may control the bidirectional inverter to operate in a maximum power point tracking (MPPT) mode.

In an aspect, a ramp rate control method for an energy storage system includes controlling a bidirectional inverter when charging an energy storage unit to store one or more of power from a grid and power from a renewable energy source; monitoring, by one or more sensors, an output power of the renewable energy source to the grid; determining whether a rate of change of the output power differs from a pre-defined ramp rate by a predetermined amount; and modifying the charging or discharging of the energy storage unit to return the rate of change of the output power to within the predetermined amount of the pre-defined ramp rate.

The energy storage system may include the renewable energy source a bidirectional inverter connected an AC bus and a DC bus, wherein the bidirectional inverter is connected to the renewable energy source and a bidirectional DC/DC converter through the DC bus, and the bidirectional inverter is connected to the grid through the AC bus; the energy storage unit connected to the bidirectional DC/DC converter; and a control system that includes one or more controllers coupled to the bidirectional inverter and the bidirectional DC/DC converter, the control system configured to facilitate the operation of the bidirectional DC/DC converter and the bidirectional inverter.

The bidirectional inverter may be a bidirectional PV inverter and the renewable energy source may be a PV array. The bidirectional PV inverter may include one or more semiconductor switches, where gates of the semiconductor switches receive a plurality of switching pulses from the control system to convert DC power received from the PV array to AC power, or to convert AC power received through the AC bus to DC power.

BRIEF DESCRIPTION OF THE FIGURES (NON-LIMITING EMBODIMENTS OF THE DISCLOSURE)

DETAILED DESCRIPTION

Reference will now be made to the accompanying drawings, which form a part hereof, and which show, by way of illustration, specific exemplary embodiments. The principles described herein may, however, be embodied in many different forms. The components in the figures are not necessarily to scale, emphasis instead being placed upon illustrating the principles of the invention. Moreover, in the figures, like referenced numerals may be placed to designate corresponding parts throughout the different views.

In the following description of the invention, certain terminology is used for the purpose of reference only, and is not intended to be limiting. For example, although the terms first, second, etc. may be used herein to describe various elements, these elements should not be limited by these terms. These terms are only used to distinguish one element from another. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed terms. It will be further understood that the terms "comprises" and/or "comprising," when used in this specification, specify the presence of stated features, integers, steps, operations, elements, and/or components, but do not preclude the presence or addition of one or more other features, integers, steps operations, elements, components, and/or groups thereof.

Embodiments of the present invention include systems and methods in which an energy storage system having a photovoltaic (PV) array and battery connected to a grid is capable of bidirectionally storing energy from the grid as well as a renewable energy source such as photovoltaic (PV) (e.g., a PV array) or wind (e.g., a wind turbine).

Figure 1:
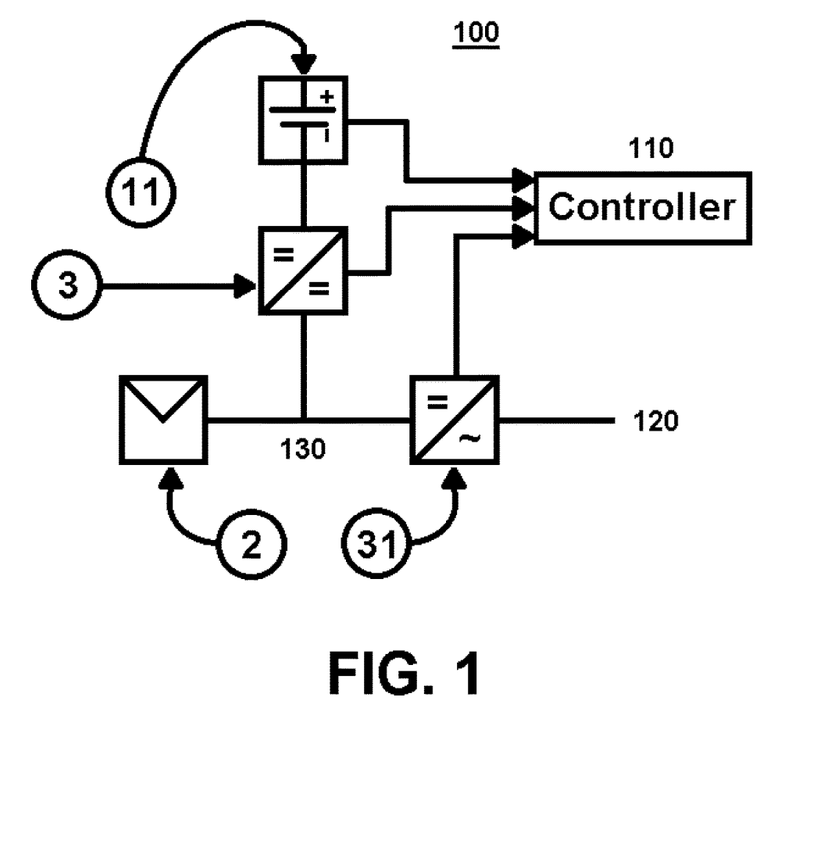
FIG. 1 shows an energy storage system for photovoltaic energy according to an embodiment of the present invention.

Referring to FIG. 1, in an embodiment, an energy storage system 100 includes a renewable energy source 2, a bidirectional PV inverter 31, energy storage unit 11, a bidirectional DC/DC converter 3, a controller 110, a DC bus 130, and an AC bus 120. The AC bus 120 may be connected to a utility grid, local loads, and/or another microgrid. In the embodiment shown in FIG. 1, renewable energy source 2 is a PV array. However, it should be understood that renewable energy source 2 is not necessarily limited to a PV array, and could be other renewable sources such as a wind energy source.

In an embodiment, the control system 110 for the renewable plus storage generation system 100 may include one or more controllers that coordinate the operation of the energy storage unit 11, converter 3, and the bidirectional inverter 31. The control system also includes sensors that interface with the controller to provide the controller with the necessary information to perform any necessary synchronization and to control the flow of power to/from the grid connected to the AC bus 120 and the flow of power to/from the energy storage unit 11. The sensors may be positioned at the DC bus 130, the AC bus 120 and the output/input of the energy storage unit 11. A variety of types of sensors may be used to sense one or more of voltage magnitude, current magnitude, frequency and phase including, for example, commercially available transducers.

FIG. 1 illustrates a case in which the control system 110 includes a single controller that controls each of the energy storage unit 11, the converter 3, and the bidirectional inverter 31. However, it should be understood that the energy storage system 100 is not limited to this particular control system layout. In another embodiment, the control system 110 for the renewable plus storage generation system 100 may include separate controllers for each of the DC/DC converter 3 and the bidirectional inverter 31. In the case in which there are separate controllers for the DC/DC converter 3 and the inverter 31, the control system 110 may include a master controller which coordinates with the separate controllers of the converter 3 and the inverter 31.

Figure 2:
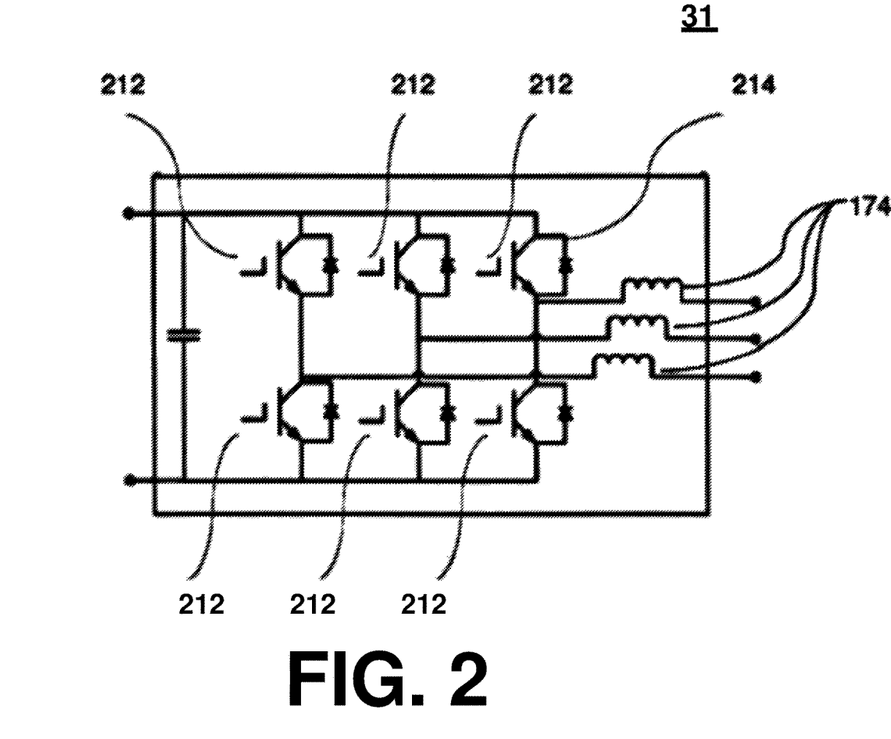
FIG. 2 shows an exemplary bidirectional PV inverter according to an embodiment of the present invention

FIG. 2 shows an exemplary bidirectional PV inverter 31 that may be used in an embodiment in which the renewable energy source is a PV array. It should be understood that the PV inverter 31 is not limited to the particular topology shown in FIG. 2. The PV inverter 31 may be other suitable topologies as long as the PV inverter 31 is bidirectional. The exemplary bidirectional PV inverter 31 shown in FIG. 2 includes a plurality of semiconductor switches 214 and a plurality of inductors 174. Gates 212 of the semiconductor switches 214 receive gate signals made up of a plurality of switching pulses for switching the semiconductor switches 214. Connected pairs of semiconductor switches 214 are configured as inverter legs. The inductors 174 are connected to each of the inverter legs between connected pairs of semiconductor switches 214. The control system 110 controls the switching pattern of the semiconductor switches 214 to convert power from DC power received from the PV array 2 to AC power, or from AC power received from the grid through the AC bus 120 to DC power. The control system 110 also controls the switching to synchronize (i.e., synchronize the frequency, phase, and magnitude of voltage/current) the inverter 31 with the grid when providing power to the grid through the AC bus 120.

The inverter 31 is connected to an AC bus 120 on the AC side of the inverter. The AC bus 120 is capable of being coupled to a utility grid, microgrid, loads and/or other AC connections. Preferably, the DC side of the inverter 31 is connected to both the converter 3 and the renewable energy source 2 at the DC bus 130. For brevity, the array is shown as a single connection in the embodiment illustrated in FIG. 1, but it should be understood that in embodiments of the present invention it is possible that panels are connected in strings with the strings being connected in a recombiner box prior to the inverter. Further, the renewable energy source 2 may be a power source other than PV, such as wind.

Preferably, the converter 3 is connected to the DC input of the PV inverter 31 and also to the energy storage unit 11 at DC bus 130. The energy storage unit 11 may include, for example, a battery, a battery bank, flywheel energy storage, etc.

Figure 3:
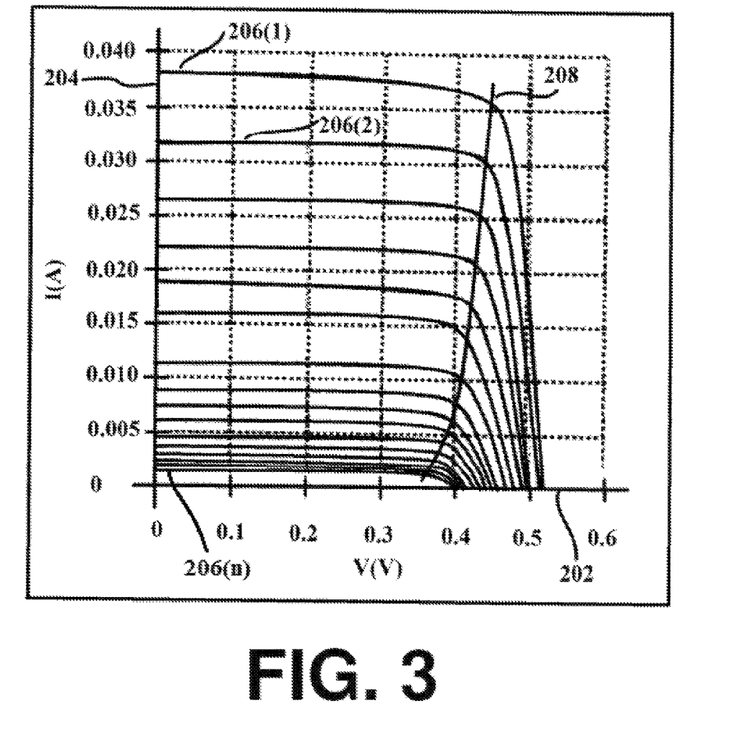
FIG. 3 is a current-voltage curve of an exemplary PV cell.

In an embodiment, when the control system 110 is controlling the bidirectional inverter 31 to supply power to the grid, the control system 110 controls the inverter 31 to operate in maximum power point tracking (MPPT) mode. When the renewable energy source 2 is a PV array, MPPT mode is used to maximize power extraction for the PV array. The amount of electric power generated by a PV array varies with the intensity of electromagnetic energy (sunlight) incident as well as the impedance of a load that the array powers. The relationship between electromagnetic intensity, load impedance, and output power can be analyzed based on a current-voltage curve (see, e.g., FIG. 3). As shown in FIG. 3, the x-axis 202 represents voltage and the y-axis 204 represents current. Exemplary curves 206(1), 206(2) . . . and 206(n) illustrate current-voltage curves at varying irradiance where irradiance decreases from curve 206(1) to curve 206(n) and n is an integer greater than 2. Efficiency is maximized when the PV cell is operated at its maximum power point. In FIG. 3, curve 208 represents the maximum power point for a PV cell.

Control system 110 controls the PV inverter to operate at or near the maximum power point. In doing so, the control system 110 samples the output power from the PV array 2 and applies the proper impedance to obtain maximum power. Control system 110 may include one or more sensors that sense the output voltage magnitude and current magnitude of the PV array 2. These readings can then be provided to the controller of the control system, which can calculate the output power of the PV array 2 and then control the PV inverter 31 to operate at the maximum power point.

In an embodiment, the control system may implement the perturb and observe MPPT method when operating in MPPT mode. In the perturb and observe method the control system controls the PV inverter 31 to adjust the PV array voltage, measure power output and then make further adjustments according to whether power increases. It should be understood that the perturb and observe method is given as an example, and other MPPT methods may also be used.

In an embodiment, the PV inverter 31 may be capable of more than one Maximum Power Point Tracking (MPPT) inputs in which the PV inverter 31 has multiple DC connections at DC bus 130 for a single AC output as AC bus 120. In this case, the inverter 31 can optimize the maximum power point of each DC input. This embodiment may be advantageous in situations where the PV array includes multiple PV modules with different current-voltage curves due to, e.g., manufacturing tolerance, partial shading, etc., or in large PV systems where the PV array covers a large geographical area.

In the embodiment shown in FIG. 1, the control system 110 combines with the bidirectional inverter 31 to allow for energy storage not only from the PV array 2, but also from the grid through the AC bus 120. That is, the control system 110 coordinates the bidirectional inverter 31 and the converter 3 so that the battery can store energy not only from the PV array 2 (e.g., when the energy bidirectional inverter 31 is disconnected from grid or when the PV array 2 and bidirectional inverter 31 are operating in MPPT mode and the PV array 2 is producing excess power) but also from the grid (e.g., when the PV array 2 is not producing sufficient power or a command is sent to charge the battery from the utility grid).

In addition, in an embodiment, the control system can control the PV inverter to enable/disable MPPT mode of operation, and enable or disable AC power commands, DC current commands, or DC voltage commands, such that as needed by the use case, the inverter 31 can export PV power via MPPT to the grid, or charge and/or discharge the battery to/from the grid. For example, the control system can disable MPPT mode and enable AC power commands/DC current or voltage commands when it desired to charge and/or discharge the battery. Thus, the control system 110 can control the bidirectional inverter 31 to switch on-the-fly from the MPPT mode, in which the bidirectional inverter is controlled to supply power to grid through the AC bus 120, to a grid storage mode, in which bidirectional inverter 31 is controlled to charge energy storage unit 11 (i.e., store energy in the energy storage unit), using energy from the grid. In doing so, the control system 110 disables MPPT mode so that PV inverter 31 no longer provides power to grid through the AC bus 120, and then enables grid storage mode so that the PV converter provides power from the grid to the energy storage unit 11 by way of converter 3.

The ability to enable/disable MPPT mode and grid storage mode allows for a variety of use cases. In an embodiment, the decision to switch from MPPT mode to grid storage mode may be made based on the output power of the PV array 2. For example, if the PV array is producing no power or the amount of power produced is less than a predetermined threshold, it may be determined that it is now advantageous to store energy from the grid in the energy storage unit 11, and the control system 110 may then control the PV inverter 31 to supply power from the grid and instruct the converter 3 to supply the power from the PV inverter 31 to the energy storage unit 11. This embodiment may be advantageous given that wholesale power prices are very low (and sometimes negative) at night when demand is low.

Supplying power from the grid through the AC bus 120 to the energy storage unit 11 requires the control system 110 to coordinate between the PV inverter 31 and the converter 3.

As noted above, the control system 110 may include a single controller that controls both the PV inverter 31 and the converter 3 or a master controller that sends commands to individual controllers of the converter 3 and PV inverter 31. The control system 110 disables MPPT mode and enables grid storage mode by controlling the PV inverter to absorb power from grid and controlling converter 3 to supply power output from the PV inverter 31 to the energy storage unit 11. The controller may also disable both MPPT mode and grid storage mode, and then enable PV storage mode. In doing so, the controller may disconnect the PV inverter 31 from the PV array through switches located at the input and/or output of the PV inverter. The controller may then control converter 3 to provide power from PV array 2 to energy storage unit 11.

Preferably, the battery 11, converter 3, control system 110, and inverter 31 are collocated within close proximity of one another to minimize costs by reducing cable lengths; and are located in a position to minimize any shading of the solar panels such as the north side of the array. However, it should be understood that the present invention is not limited as such. Furthermore, embodiments of the present invention including the storage 11, converter 3, and controller 110 may be installed with new construction or retrofitted to an existing solar PV installation.

In embodiments of the present invention, the control system 110 can be connected to the converter, battery, and inverter through a means of communication such as Modbus TCP over copper or fiber, or wirelessly through short range wireless communication, wireless local area networking, etc. Additional communications connections may be made to any of the assets of the power system by the owner, operator, or a third party data collection service to monitor the operation and performance of the system. These remote connections may, e.g., be made via cellular, satellite, hard-wired connection, etc.

Figure 4:
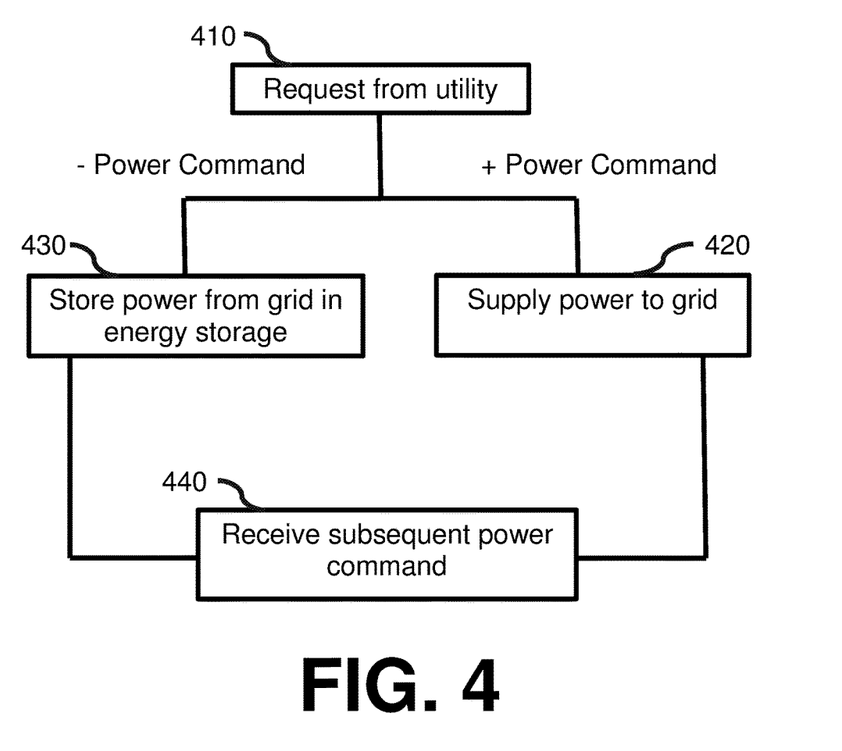
FIG. 4 is a flowchart illustrating a frequency regulation method implemented by an energy storage system according to an embodiment of the present invention.

In an embodiment, the energy storage system of FIG. 1 can be used to implement frequency regulation of a utility grid voltage at the grid. FIG. 4 is a flowchart illustrating a frequency regulation method implemented by an energy storage system such as the energy storage system shown in FIG. 1 according to an embodiment of the present invention.

Referring to FIG. 4, in step 410, control system 110 receives a request from the utility to participate in frequency regulation. The request may, for example, be a call from a regional transmission organization (RTO) routed via a network operations center to supply or absorb power in response to a frequency regulation dispatch signal. The frequency regulation dispatch signal may include a positive power command in to instruct the control system 110 to supply power to the grid for frequency regulation, or a negative power command to instruct the control system 110 to absorb power from the grid. The positive or negative power command may also be a separate command rather than being included with the request to participate in frequency regulation.

Steps 420 and 430 are dependent upon whether the power command is positive or negative. When the power command is a positive power command to supply power to the grid for frequency regulation, step 420 is performed, and the control system 110 controls the PV inverter to supply power to the grid through the AC bus 120. When supplying power to the grid, the PV inverter 31 may operate in MPPT mode. When the power command is a negative power command to absorb power from the grid, step 430 is performed. In step 430, the control system controls the PV inverter 31 to absorb power from the grid, and the control system controls the converter 3 to supply power from PV inverter 31 and store it in the energy storage unit 11.

The positive or negative power signal from the utility may be a period signal that is repeated, e.g., every two seconds. Accordingly, in step 440, the control system receives a positive or negative power signal. If the previous signal was a positive power command and the current signal is a negative power command, the control system 110 controls the PV inverter 31 to disable MPPT mode and to enable grid storage mode, so that energy is absorbed form the grid and stored in the energy storage unit. If the previous signal was a negative power command and the current signal is a positive power command, the control system 110 controls the PV inverter to disable grid storage mode and enable MPPT mode. If the previous and current power commands are positive, the control system 110 continues to operate in MPPT mode and supplies the magnitude of power commanded by the positive power command. If the previous and current power commands are negative, the control system continues to operate in grid storage mode and absorbs the magnitude of power commanded by the negative power command.

Figure 5:
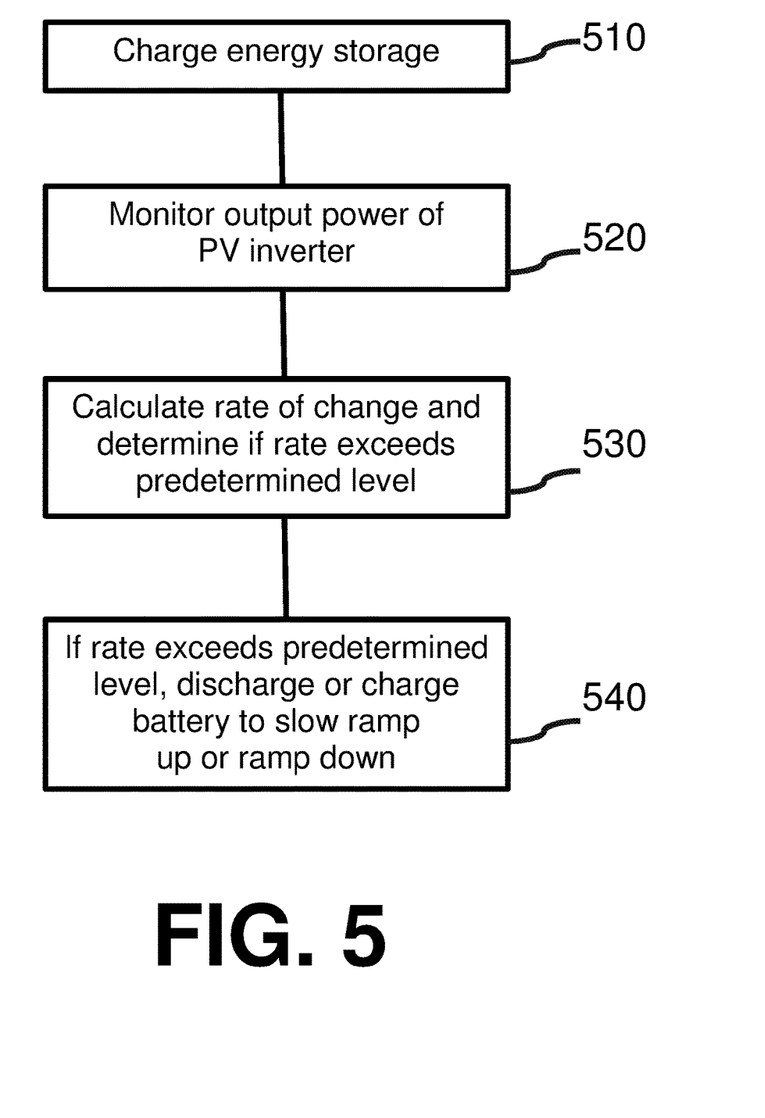
FIG. 5 is a flowchart illustrating a ramp rate control method implemented by an energy storage system according to an embodiment of the present invention.

In another embodiment, the energy storage system of FIG. 1 can be used to implement ramp rate control. FIG. 5 is a flowchart illustrating a ramp rate control method implemented by an energy storage system such as the energy storage system shown in FIG. 1 according to an embodiment of the present invention.

PV production is dependent upon sunshine, and thus, PV power production can fluctuate with the passing of clouds or other shading events. When these shading events occur, down ramping happens, and when the sunlight returns up ramping happens. If there is sharp up ramping or down ramping, damage may be done to the power system or other systems that are connected to the power system (e.g., a high ramp rate could cause over/under frequency events which would cause system failures). For example, if substantial cloud coverage comes while the solar farm is at full power, the output power from the PV array may go from maximum power to a very low magnitude, and the grid and loads are not well equipped to handle a very fast rate of change of power. In an embodiment, the control system 110 and converter mitigate both up ramping and down ramping events caused by shading by partially charging during up ramping events and partially discharging during down ramping events to maintain a pre-defined ramp rate (rate of change of power with respect to time).

The control system 110 controls the operation of the converter 3 and inverter 31 so that the system 100 operates in ramp rate control to maintain a pre-defined ramp rate. Referring to FIG. 5, in step 510, the energy storage unit 11 is charged. When charging the energy storage unit 11, the controller 110 may control the PV inverter to operate in grid storage mode in which the PV inverter supplies power from the grid. The control system 110 controls the power converter 3 to store the power from the PV inverter 31 in the energy storage unit 11. Alternatively, the control system 110 may control the power converter 3 to store power from the PV array in the energy storage unit 11 in addition to, or instead of, any absorbed power from the grid.

In step 520, when ramp control is initiated, the control system 110 monitors the output power of the PV inverter 31 to the grid. Such monitoring may take place through the use of sensors that sense the magnitude of voltage output by the inverter 31.

In step 530: the controller determines whether the rate of change of the power differs from a pre-defined ramp rate by a set amount. In step 540: when it is determined that the rate differs by the set amount, the control system 110 controls the converter 3 to discharge or charge the battery to slow the ramp up or ramp down (e.g., supplement the lost solar production to slow down the ramp rate of the output power).

In another embodiment, the energy storage system 100 of FIG. 1 may be a microgrid 100 that can operate in grid forming mode, in which the PV inverter forms a grid. The PV inverter may operate in grid forming mode when the energy storage system is normally connected to a utility grid, but become disconnected either because of a grid event (e.g., blackout) or because it becomes desirable to disconnect the system 100 from the grid. When operating in grid forming mode, the control system 110 controls the PV inverter to "make the grid." The PV array may combine with the energy storage unit to supply the appropriate power conditions to any local loads. Furthermore, in an embodiment, the microgrid 100 may include additional AC coupled power sources. In this embodiment, if the sum of power generation from the renewable source 2 and any AC coupled sources exceeds load demand, the control system 100 may then control the inverter 31 and converter 3 to store excess power generation in the energy storage unit 11.

It will be apparent to those skilled in the art that various modifications and variations can be made to the disclosed power system without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

The invention claimed is:

1. An energy storage system for renewable energy applications, comprising:
   a renewable energy source;
   a bidirectional inverter connected to an AC bus and a DC bus, wherein the bidirectional inverter is connected to the renewable energy source and a bidirectional DC/DC converter through the DC bus;
   an energy storage unit connected to the bidirectional DC/DC converter; and
   a control system comprising one or more controllers coupled to the bidirectional inverter and the bidirectional DC/DC converter, the control system configured to facilitate the operation of the bidirectional DC/DC converter and the bidirectional inverter,
   wherein the control system controls the bidirectional inverter to operate in a maximum power point tracking (MPPT) mode or a grid storage mode, and the control unit controls an on-the-fly transition between MPPT mode and the grid storage mode.

2. The energy storage system of claim 1, wherein the renewable energy source is at least one of a photovoltaic (PV) array, a wind energy source, or a hydro energy source.

3. The energy storage system of claim 1, wherein the bidirectional inverter is connected to at least one of a utility grid, a local load, or a microgrid through the AC bus.

4. The energy storage system of claim 3, wherein the control system further comprises one or more sensors, the one or more sensors configured to sense at least one of voltage magnitude, frequency, and phase.

5. The energy storage system of claim 4, wherein the control system is configured to synchronize at least one of the frequency, phase, and magnitude of the voltage or current of the inverter when providing power to the at least one of a utility grid, local load, or microgrid.

6. The energy storage system of claim 1, wherein the energy storage unit is at least one of a battery, a battery bank, or a flywheel energy storage unit.

7. The energy storage system of claim 1, wherein the control system selectively enables the operation of the bidirectional inverter and the bidirectional DC/DC converter to export power generated by the renewable energy source to a grid, charge the energy storage unit from the grid, or discharge the energy storage unit to the grid.

8. The energy storage system of claim 1, wherein the renewable energy source is a photovoltaic (PV) array and the control system is configured to sample an output power from the PV array and selectively apply voltage to obtain a maximum power.

9. The energy storage system of claim 8, wherein the bidirectional inverter includes a plurality of DC connections at the DC bus for a single AC output at the AC bus,
   wherein the bidirectional inverter is configured to optimize a maximum power for each of the plurality of DC connections.

10. The energy storage system of claim 8, wherein the on-the-fly transition between MPPT mode and the grid storage mode is controlled by the control unit when an output power of the PV array is less than a predetermined threshold power.

11. The energy storage system of claim 1, wherein the bidirectional inverter is a bidirectional PV inverter and the renewable energy source is a PV array, the bidirectional PV inverter comprising:
    one or more semiconductor switches, wherein gates of the semiconductor switches receive a plurality of switching pulses from the control system to convert DC power received from the PV array to AC power, or to convert AC power received through the AC bus to DC power.

12. The energy storage system of claim 1, wherein the energy storage unit is configured to store energy from both the renewable energy source and a grid.

13. A method of supporting frequency regulation of a utility grid voltage by an energy storage system, the method comprising:
    receiving a power command;
    supplying power to the utility grid for frequency regulation when the power command is a positive power command;
    absorbing power from the utility grid when the power command is a negative power command; and
    receiving a second power command, and supplying power to the utility grid or absorbing power from the utility grid in accordance with the second power command.

14. The method of claim 13, wherein the energy storage system comprises:
    a renewable energy source;
    a bidirectional inverter connected to an AC bus and a DC bus, wherein the bidirectional inverter is connected to the renewable energy source and a bidirectional DC/DC converter through the DC bus, and the bidirectional inverter is connected to the utility grid through the AC bus;
    an energy storage unit connected to the bidirectional DC/DC converter; and
    a control system comprising one or more controllers coupled to the bidirectional inverter and the bidirectional DC/DC converter, the control system configured to facilitate the operation of the bidirectional DC/DC converter and the bidirectional inverter.

15. The method of claim 14,
wherein the supplying power to the utility grid comprises selectively enabling, by the control system, the operation of the bidirectional inverter and the bidirectional DC/DC converter to supply power generated by the renewable energy source to the utility grid or discharging the energy storage unit to the grid, and
wherein the absorbing power from the utility grid comprises charging the energy storage unit from the grid.

16. The method of claim 14, further comprising, controlling, by the control unit, the bidirectional inverter to operate in a maximum power point tracking (MPPT) mode or a grid storage mode; and
controlling, by the control unit, an on-the-fly transition between the MPPT mode and the grid storage mode as required by a frequency regulation dispatch signal.

17. The method of claim 14, wherein the bidirectional inverter is a bidirectional PV inverter and the renewable energy source is a PV array, the bidirectional PV inverter comprising:
one or more semiconductor switches, wherein gates of the semiconductor switches receive a plurality of switching pulses from the control system to convert DC power received from the PV array to AC power, or to convert AC power received through the AC bus to DC power.

18. An output power ramp rate control method for an energy storage system, comprising:
controlling a bidirectional inverter when charging an energy storage unit to store one or more of power from a grid and power from a renewable energy source;
monitoring, by one or more sensors, an output power of the renewable energy source to the grid;
determining whether a rate of change of the output power differs from a pre-defined ramp rate by a predetermined amount; and
modifying the charging or discharging of the energy storage unit to return the rate of change of the output power to within the predetermined amount of the pre-defined ramp rate.

19. The method of claim 18, wherein the energy storage system comprises:
the renewable energy source;
a bidirectional inverter connected to an AC bus and a DC bus, wherein the bidirectional inverter is connected to the renewable energy source and a bidirectional DC/DC converter through the DC bus, and the bidirectional inverter is connected to the grid through the AC bus;
the energy storage unit connected to the bidirectional DC/DC converter; and
a control system comprising one or more controllers coupled to the bidirectional inverter and the bidirectional DC/DC converter, the control system configured to facilitate the operation of the bidirectional DC/DC converter and the bidirectional inverter.

20. The method of claim 19,
wherein the bidirectional inverter is a bidirectional PV inverter and the renewable energy source is a PV array, the bidirectional PV inverter comprising:
one or more semiconductor switches, wherein gates of the semiconductor switches receive a plurality of switching pulses from the control system to convert DC power received from the PV array to AC power, or to convert AC power received through the AC bus to DC power.

* * * * *